(12) United States Patent
Roberts et al.

(10) Patent No.: US 11,619,323 B2
(45) Date of Patent: Apr. 4, 2023

(54) METHOD OF DESIGNING A PIPE JOINT FOR USE IN A SUBSEA PIPELINE

(71) Applicant: VERDERG PIPE TECHNOLOGY LIMITED, Kingston upon Thames (GB)

(72) Inventors: Peter Roberts, Kingston upon Thames (GB); Alastair Walker, Kingston upon Thames (GB); Janet Heffernan, Kingston upon Thames (GB)

(73) Assignee: VERDERG PIPE TECHNOLOGY LIMITED, Kingston Upon (GB)

( * ) Notice: Subject to any disclaimer, the term of this patent is extended or adjusted under 35 U.S.C. 154(b) by 647 days.

(21) Appl. No.: 16/624,876

(22) PCT Filed: Jun. 19, 2018

(86) PCT No.: PCT/GB2018/051695
§ 371 (c)(1),
(2) Date: Dec. 19, 2019

(87) PCT Pub. No.: WO2018/234779
PCT Pub. Date: Dec. 27, 2018

(65) Prior Publication Data
US 2020/0132225 A1    Apr. 30, 2020

(30) Foreign Application Priority Data

Jun. 20, 2017 (GB) ...................... 1709816

(51) Int. Cl.
*F16L 1/26* (2006.01)
*G01N 3/12* (2006.01)

(52) U.S. Cl.
CPC .................. *F16L 1/26* (2013.01); *G01N 3/12* (2013.01); *G01N 2203/0003* (2013.01);
(Continued)

(58) Field of Classification Search
CPC ...... F16L 1/26; G01N 3/12; G01N 2203/0003; G01N 2203/0019; G01N 2203/0218; G01N 2203/0232; G01N 2203/0274
(Continued)

(56) References Cited

U.S. PATENT DOCUMENTS

| 2014/0350904 A1* | 11/2014 | Shimanuki | ............... G01N 3/32 |
| | | | 703/2 |
| 2017/0293712 A1* | 10/2017 | Dekker | ................... G06F 30/15 |

FOREIGN PATENT DOCUMENTS

| WO | 2008/114049 A2 | 9/2008 |
| WO | WO-2008114049 A2 * | 9/2008 ............... G01N 3/12 |

OTHER PUBLICATIONS

Solano et al., "Safety Factors Calibration for Wall Thickness Design of Ultra Deepwater Pipelines", Proceedings of the ASME 2013 32nd International Conference on Ocean, Offshore and Arctic Engineering, June 9-14, Nantes, France (Year: 2013).*
(Continued)

*Primary Examiner* — Nathaniel T Woodward
(74) *Attorney, Agent, or Firm* — Seed Intellectual Property Law Group LLP

(57) ABSTRACT

A method of determining a minimum wall thickness for a pipe joint for use in a subsea pipeline comprises the steps of: i) determining an internal diameter of the pipe joint; ii) determining a minimum allowable hydrostatic pressure at the depth at which the pipe joint is to be used; iii) determining a target wall thickness for the pipe joint, the target wall thickness corresponding to the internal diameter and the minimum allowable hydrostatic pressure; iv) manufacturing a plurality of preliminary pipe joints having the internal diameter and the target wall thickness; v) carrying out external pressure collapse tests resulting in data representative of the hydrostatic collapse pressures at which the plurality of preliminary pipe joints collapse; vi) determining
(Continued)

Figure 1:
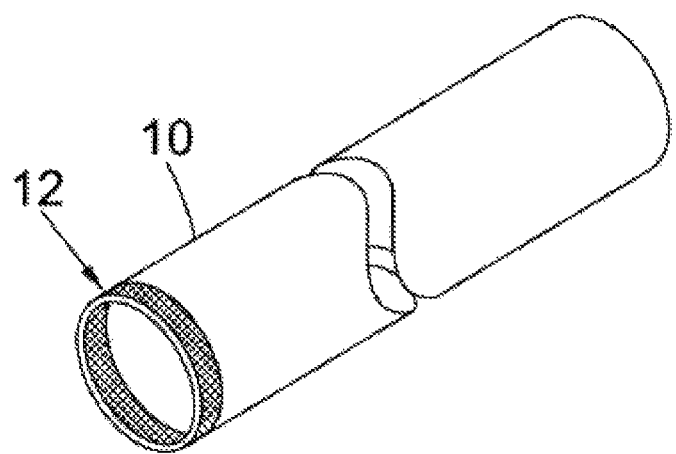

a probability distribution corresponding to the data based on a statistical tail model derived from Extreme Value Theory; vii) determining from the probability distribution a hydrostatic collapse pressure occurring with a probability of $10^{-5}$ or lower; and, viii) determining a wall thickness of the pipe joint corresponding to the internal diameter and the hydrostatic collapse pressure.

23 Claims, 6 Drawing Sheets

(52) U.S. Cl.
CPC ............... *G01N 2203/0019* (2013.01); *G01N 2203/0218* (2013.01); *G01N 2203/0232* (2013.01); *G01N 2203/0274* (2013.01)

(58) Field of Classification Search
USPC .......................................................... 285/93
See application file for complete search history.

(56) References Cited

OTHER PUBLICATIONS

Bruschi et al., "Pipe technology and installation equipment for frontier deep water projects," *Ocean Engineering* 108:369-392, 2015.

DeGeer et al., "Blue Stream Collapse Test Program", $24^{th}$ International Conference on Offshore Mechanics and Arctic Engineering vol. 3, Halkidiki, Greece, Jun. 12-17, 2005, pp. 499-507.

Liu, "Statistical methods for extreme values and degradation analysis" Graduate Theses and Dissertations, 13351, http://lib.dr.iastate.edu/etd/13351, 2013.

Oazen et al., "Potential Cost Savings in Wall Thickness Design of Ultra Deepwater Rigid Pipelines", Proceedings of the ASME 2011 $30^{th}$ International Conference on Ocean, Offshore and Arctic Engineering, vol. 4, Rotterdam, The Netherlands, Jun. 19-24, 2011, pp. 267-263.

Oazen et al., "Safety Factors Calibration for Wall Thickness Design of Ultra Deepwater Pipelines", Proceedings of the ASME 2013 $32^{nd}$ International Conference on Ocean, Offshore and Arctic Engineering, vol. 4A, Nantes, France, Jun. 9-14, 2013. (12 pages).

\* cited by examiner

METHOD OF DESIGNING A PIPE JOINT FOR USE IN A SUBSEA PIPELINE

BACKGROUND

Technical Field

Embodiments of this disclosure relate generally to a method of designing a pipe joint for use in a subsea pipeline, and more particularly to a method of determining a minimum wall thickness for the pipe joint.

Description of the Related Art

In the oil and gas industry there has been a steady development over the past 20 years in the manufacture of subsea pipelines suitable for installation and operation in ultra-deep water, typically water deeper than 2,000 m, to access deep-water reservoirs of oil and/or gas. Currently small diameter pipes of about 16 in (about 41 cm) in diameter have been installed up to a depth of around 3,000 m. Larger diameter pipes of up to 32 in (about 81 cm) in diameter have been installed in water depths of up to 2,500 m. It is likely that future projects will require the installations and operation of pipes in depths up to 3,500 m and beyond.

Such pipelines are typically installed filled with air at atmospheric pressure and subsequently filled with oil or gas under pressure once the installation has been completed. A major risk during the installation of this type of pipeline is from the hydrostatic pressure applied by the water, which can cause the pipeline to deform from its virtually initial round shape to an almost flat shape. This is called external pressure collapse, and if not controlled can result in the total loss of the pipeline. When determining the potential for external pressure collapse, the main dimensions of the pipeline are the internal diameter and the wall thickness. These dimensions are also the main drivers in determining whether or not a pipeline is economically feasible: the internal diameter controls the rate at which oil or gas can be transported through the pipeline, and so affects the operational cost over the lifetime of the pipeline; and, the wall thickness is directly proportional to the cost of manufacturing and installing the pipeline. That is, the cost of manufacturing and installing the pipeline increases as the wall thickness increases.

Standard industrial design guidance for calculating the dimensions for pipelines required to operate at specified depths have been used for decades. However, such guidance assess too highly the minimum wall thickness of a pipeline so as to ensure, as far as possible, the avoidance of external pressure collapse. But such a conservative approach adds significantly to the cost of manufacturing and installing pipelines.

Accordingly, there is a need for a method that can more accurately determine the wall thickness of a pipeline whilst minimizing the possibility of an external pressure collapse.

BRIEF SUMMARY

According to a first aspect of the invention, there is provided a method of determining a wall thickness of a pipe joint for use in a subsea pipeline, the method comprising the steps of: i) determining an internal diameter of the pipe joint; ii) determining a minimum allowable hydrostatic pressure at the depth at which the pipe joint is to be used; iii) determining a target wall thickness for the pipe joint, the target wall thickness corresponding to the internal diameter and the minimum allowable hydrostatic pressure; iv) manufacturing a plurality of preliminary pipe joints having the internal diameter and the target wall thickness; v) carrying out external pressure collapse tests resulting in data representative of the hydrostatic collapse pressures at which the plurality of preliminary pipe joints collapse; vi) determining a probability distribution corresponding to the data based on a statistical tail model derived from Extreme Value Theory; vii) determining from the probability distribution a hydrostatic collapse pressure corresponding to a probability of $10^{-5}$ or lower; and, viii) determining a wall thickness of the pipe joint corresponding to the internal diameter and the hydrostatic collapse pressure. This method is used to design pipe joints having a reduced wall thickness when compared to the wall thickness provided by conventional methods of pipe joint design. Accordingly, the method is a notable departure from the conventional methods, which were established decades ago and continue to be used today, and provide a considerable commercial advantage in the availability of subsea pipelines, and in manufacturing and installing pipe joints for use in the pipelines.

Preferably, step v) further includes the steps of: cutting a ring from one or more of the plurality of preliminary pipe joints; forming flat substantially parallel surfaces on the ends of the ring; providing means for measuring strain and deformation of the ring; mounting the ring in a pressure chamber such that the ends of the ring form seals with opposing walls of the chamber to isolate the inside of the ring from the outside; increasing the pressure outside the ring and measuring the strain and deformation on the ring as the pressure increases; and, determining a comparison of pressure applied to the outside of the ring and maximum strain measured to detect the onset of accelerating non-linear reduction in ring diameter with increasing pressure. This provides a reliable, cost effective method of carrying out external pressure tests when compared to full-scale pipe tests.

Preferably, the step of providing means for measuring strain and deformation of the ring comprises applying sensors to the ring. It is particularly preferred that they are deploying the sensors on the inner surface of the ring.

Preferably, the step of mounting the ring in the pressure chamber includes providing seals between the ends of the ring and the walls of the chamber and the step of increasing the pressure outside the ring includes pumping pressurized fluid into the chamber around the outside of the ring.

The length of ring cut from the pipe joint is preferably selected such that the pipe joint still remains within tolerances for use in the pipeline. It is typically selected to be about twice the thickness of the wall of the pipe joint. Alternatively, the length is substantially 50 mm.

Preferably, step ii) further includes the step of applying a safety factor to the depth at which the pipe joint is to be used in order to increase the minimum allowable hydrostatic pressure, and so the target wall thickness of the pipe joint. Preferably, the safety factor is a coefficient. It is particularly preferably that the safety factor is 1.1. Alternatively, the safety factor is added to the depth at which the pipe joint is to be used.

Preferably, step vii) comprises determining from the probability distribution a hydrostatic collapse pressure occurring with a probability of $10^{-6}$ or $10^{-7}$. This level of probability is chosen to correspond to the nominal probability level of $10^{-6}$ for a very high safety class event.

Preferably, the statistical tail model is a Generalized Pareto Distribution (GPD). The GPD is a statistical tail model derived from Extreme Value Theory. The GPD describes the distribution of excesses of a physical process which lie beyond a suitably chosen threshold. Statistical Extreme Value Theory tells us that the GPD includes all classes of tail behavior which are non-degenerate.

Preferably, the scale and shape parameter values of the GPD are derived using Bayesian MCMC methods rather than standard maximum likelihood which is prone to non-regular behavior in applications where the tails or extremes of the underlying distribution are extremely short. It is particularly preferable that the shape parameter value of the GPD is <−0.5; that is, −0.5 or less.

Preferably, the method further comprises the step of manufacturing a plurality of pipe joints having the internal diameter and the wall thickness. It is particularly preferable that external pressure collapse tests are carried out resulting in data representative of the hydrostatic collapse pressures at which the plurality of pipe joints collapse.

Preferably, the external pressure collapse tests comprise the following steps: cutting a ring from one or more of the plurality of pipe joints; forming flat substantially parallel surfaces on the ends of the ring; providing means for measuring strain and deformation of the ring; mounting the ring in a pressure chamber such that the ends of the ring form seals with opposing walls of the chamber to isolate the inside of the ring from the outside; increasing the pressure outside the ring and measuring the strain and deformation on the ring as the pressure increases; and, determining a comparison of pressure applied to the outside of the ring and maximum strain measured to detect the onset of accelerating non-linear reduction in ring diameter with increasing pressure.

According to a second aspect of the invention, there is provided a pipe joint for use in making a subsea pipeline, the pipe joint having a minimum wall thickness determined using the method of the first aspect of the invention.

According to a third aspect of the invention, there is provided a subsea pipeline comprising one or more pipe joints having a minimum wall thickness determined using the method of the first aspect of the invention.

According to a fourth aspect of the invention, there is provided a method of determining a hydrostatic collapse pressure of a pipe joint for use in a subsea pipeline, the method comprising the steps of: i) determining an internal diameter of the pipe joint; ii) determining a minimum allowable hydrostatic pressure at the depth at which the pipe joint is to be used; iii) determining a target wall thickness for the pipe joint, the target wall thickness corresponding to the internal diameter and the minimum allowable hydrostatic pressure; iv) manufacturing a plurality of preliminary pipe joints having the internal diameter and the target wall thickness; v) carrying out external pressure collapse tests resulting in data representative of the hydrostatic collapse pressures at which the plurality of preliminary pipe joints collapse; vi) determining a probability distribution corresponding to the data based on a statistical tail model derived from Extreme Value Theory; and, vii) determining from the probability distribution a hydrostatic collapse pressure occurring with a probability of $10^{-5}$ or lower.

Preferably, the method further comprises the step of determining the wall thickness of the pipe joint corresponding to the internal diameter and the hydrostatic collapse pressure.

BRIEF DESCRIPTION OF THE SEVERAL VIEWS OF DRAWINGS

Figure 2:
Figure 3:
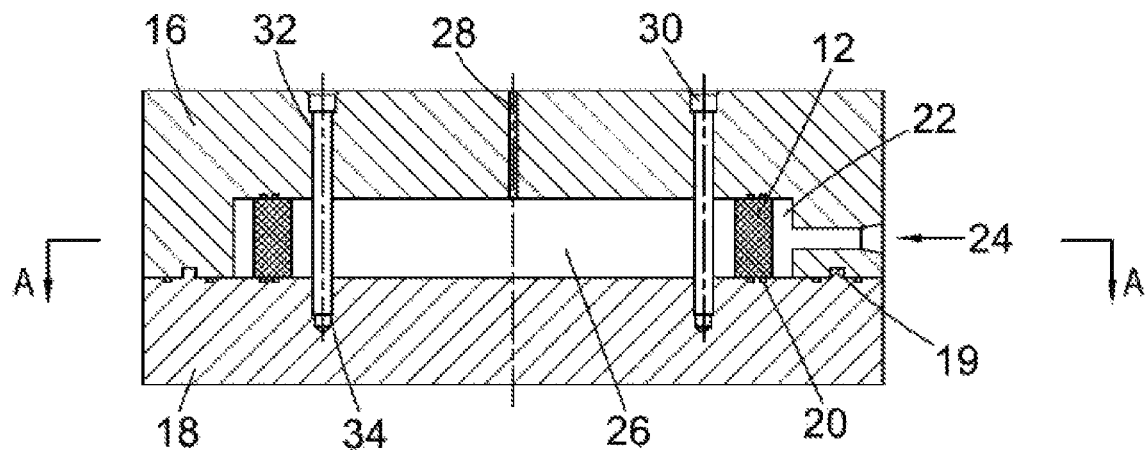
Figure 4:
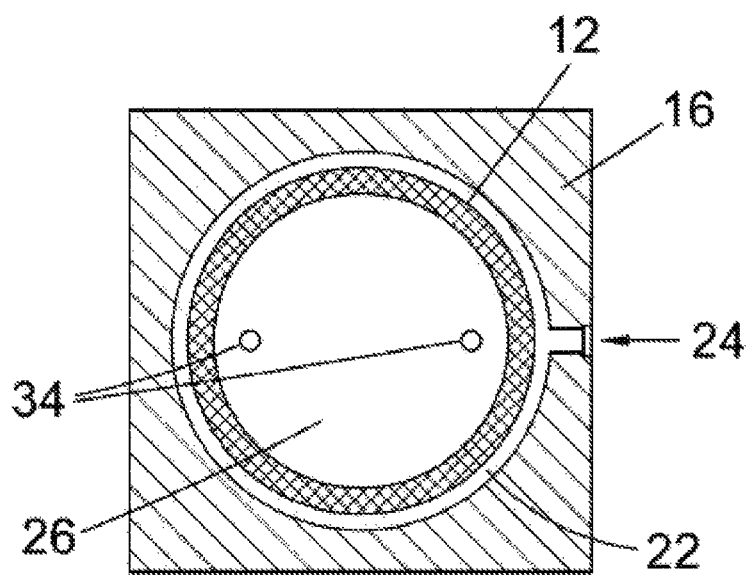
Figure 5:
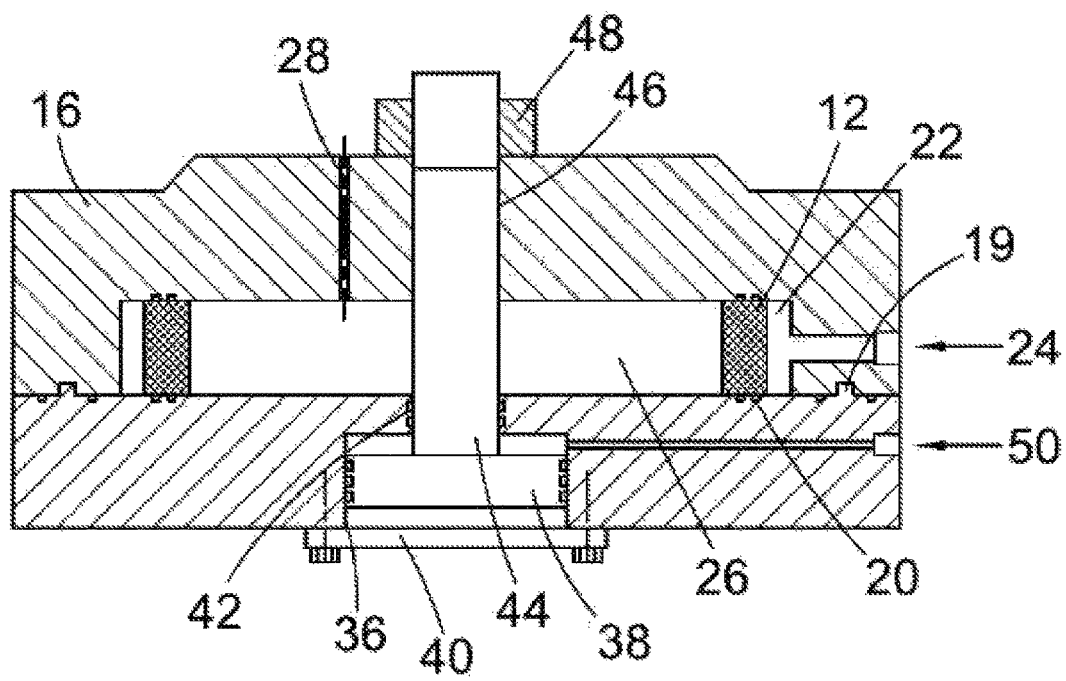
Figure 6:
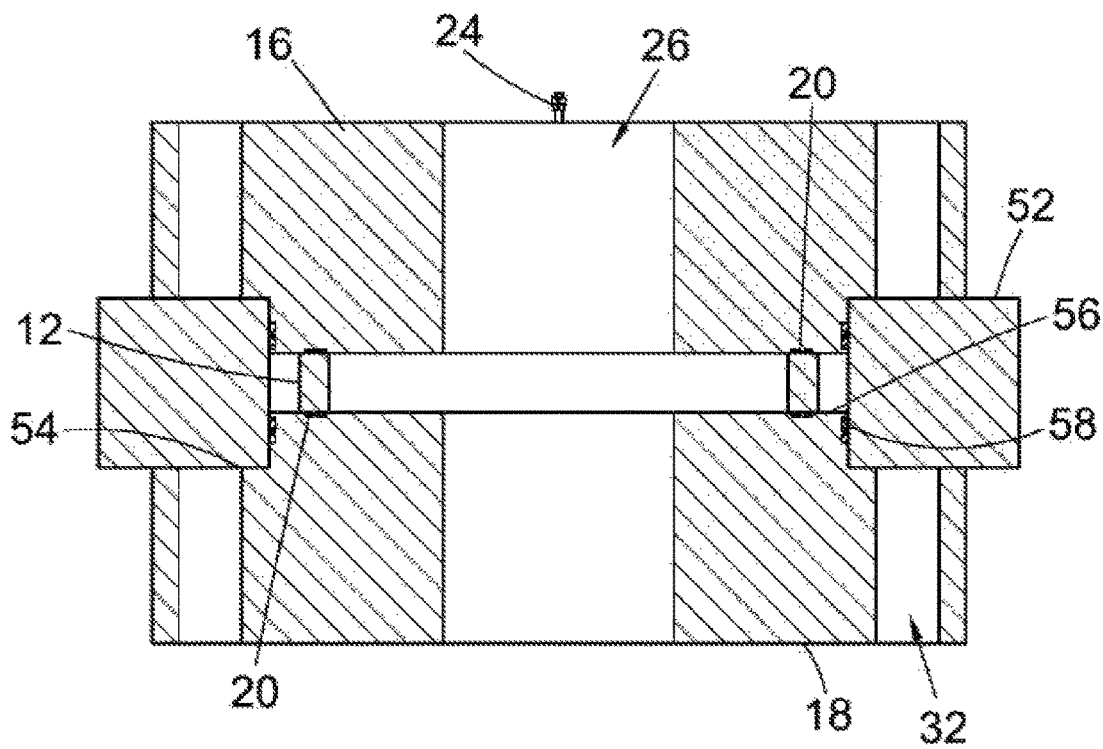
Figure 7:
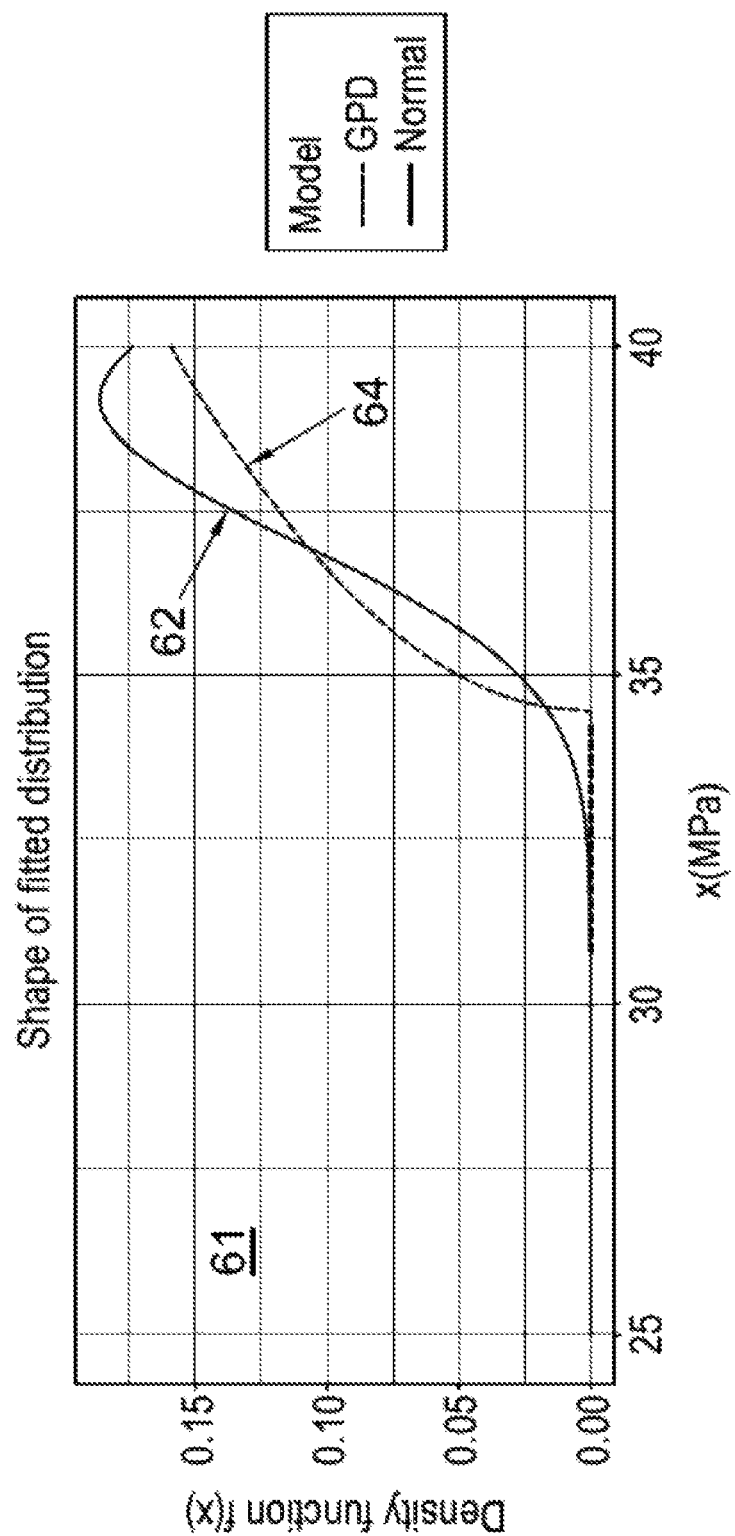
Figure 8:
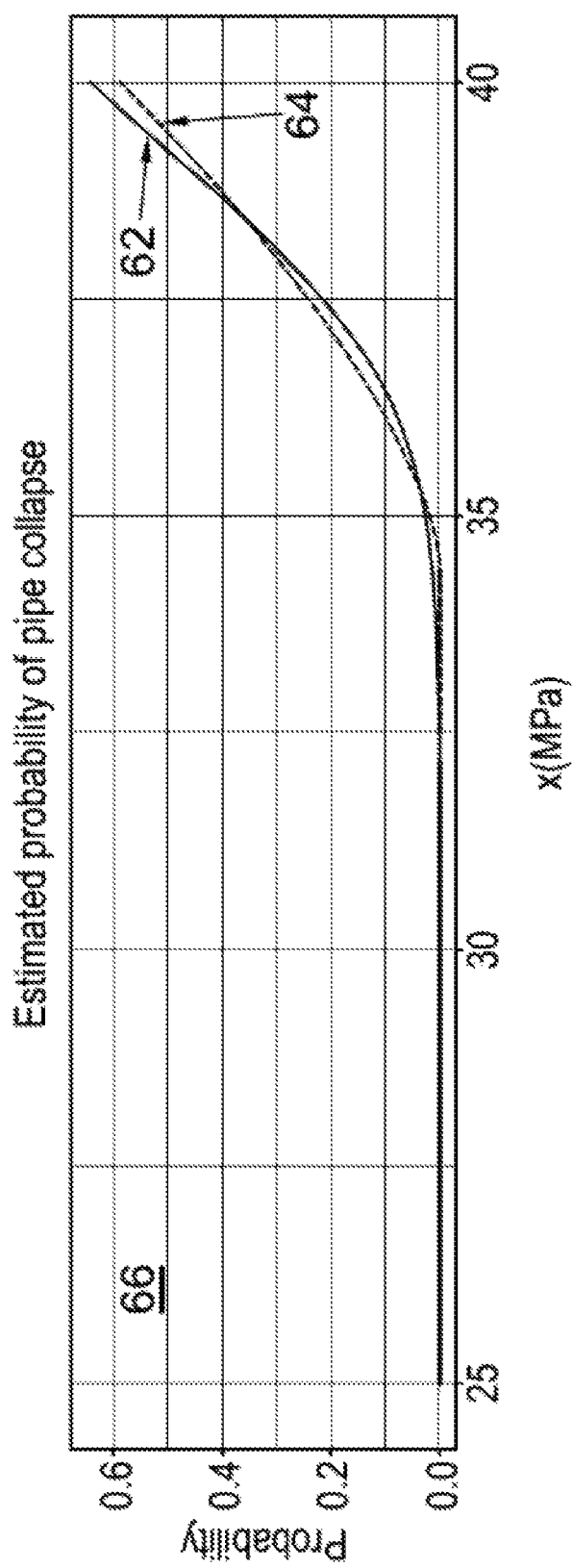
Figure 9:
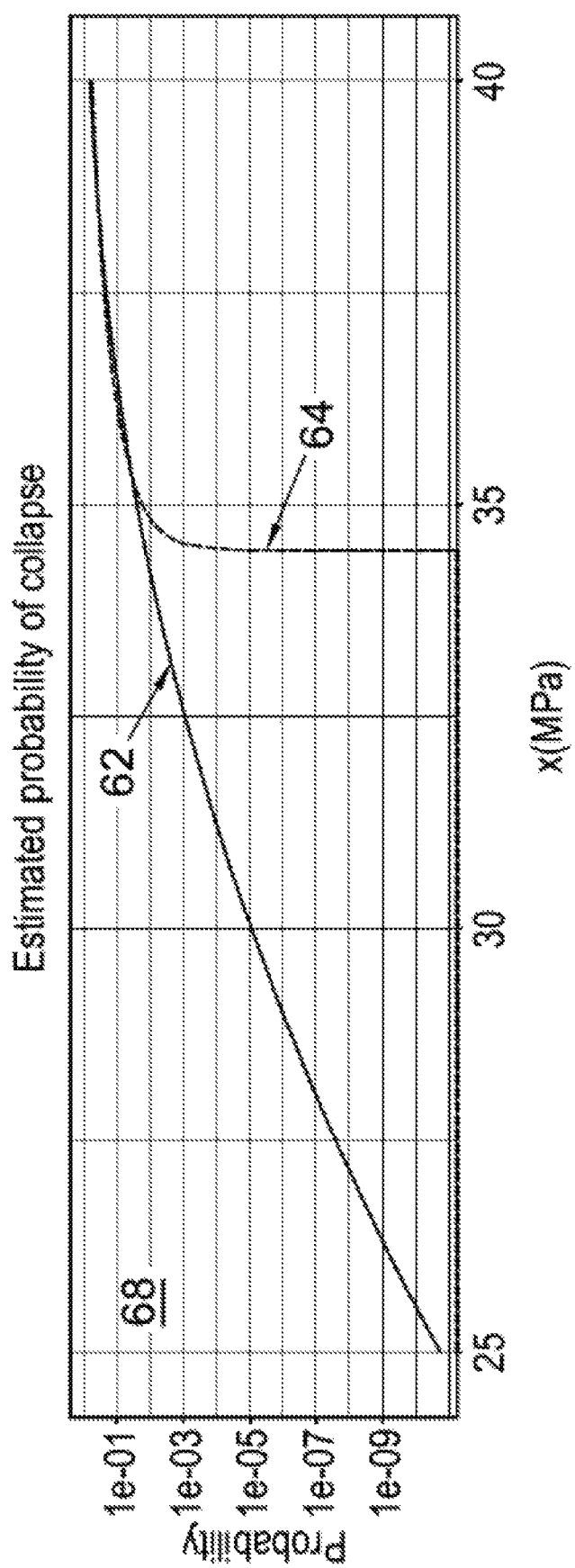

The above and other aspects of the invention will now be described, by way of example only, with reference to the accompanying drawings, in which:

FIG. 1 shows a pipe joint of the type for testing;
FIG. 2 shows a cross section of a test ring cut from the pipe joint of FIG. 1;
FIG. 3 shows a cross section of a test apparatus;
FIG. 4 shows a section on line A-A of FIG. 3;
FIG. 5 shows a cross section of a second embodiment of the test apparatus;
FIG. 6 shows a cross section of a third embodiment of the test apparatus;
FIG. 7 is a graph of the probability density function plotted against the hydrostatic pressure, showing the difference between a fitted Normal model and a fitted GPD model;
FIG. 8 is a graph showing the distribution functions for the two models from FIG. 7 over a probability range of 0 to 0.6; and,
FIG. 9 is a graph showing the distribution functions for the two models from FIG. 7 over a probability range $10^{-1}$ to $10^{-9}$.

In the drawings, like parts are denoted by like reference numerals.

DETAILED DESCRIPTION

When selecting a subsea pipeline system, all aspects relating to its design should be considered including, of course, the internal diameter and wall thickness of the pipe joints used in making the pipeline. The internal diameter of a pipe joint is calculated to make certain that the fluid flow through the pipeline will be sufficient to ensure the economic success of the pipeline during its operational lifetime. Once the internal diameter has been calculated, a target wall thickness of the pipe joint is then calculated according to the internal diameter and the hydrostatic pressure at the depth at which the pipeline is to be used so as to avoid, in so far as possible, external pressure collapse during installation of the pipeline. The target wall thickness can be calculated using standard industrial design guidance. An example of such guidance that is commonly used for such calculations is DNV-OS-F101, in which the safety from the pressure collapse failure during pipeline installation is determined by the use of an approximate theoretical model of the pressure collapse process, together with several theoretically derived factors related to the pipe material properties and a general theoretically derived safety factor. In the example guidance, the target wall thickness for a pipe joint is obtained by applying a safety factor of 1.32 to the depth at which the pipeline is to be used. This increases the hypothetical hydrostatic pressure that the pipe joint would be exposed to, leading to an increase in the target wall thickness. However, in the present disclosure, a safety factor of 1.1 can be used. The safety factor of 1.32 has been calibrated using a Load and Resistance Factor Design (LRFD) method in comparison with collapse pressure test results available at the time the guidance was prepared. Because of the large financial implications of losing a very long pipeline during installation in ultra-deep water, it has been the practice during specific projects to further base the design of pipelines on specific pipe joint collapse tests. However, pressure testing full-scale pipe joints is expensive that requires a suitable pressure chamber. Only a few chambers capable of applying pressures corresponding to very deep water are available in the world, and transporting the pipe joints from a pipe mill to a suitable test facility is often inconvenient and expensive. At least for these reasons, typically only a few full-scale pipe pressure tests are carried out during a specific project involving an ultra-deep water pipeline.

Tests on long sections of individual pipe joints have shown that the deformations that lead to external pressure collapse are virtually uniform along the pipe length. This observation is supported by practical tests, theoretical studies and numerical modelling. The implication is that the hydrostatic pressure at which external pressure collapse occurs will be the same for a ring cut from a pipe joint as for the complete pipe joint itself, provided that the ring is subjected to the same loading as the pipe joint. The applicant developed an alternative external pressure collapse test, to replace the full-scale pipe test, using a test method based on cutting rings from a pipe joint and machining the ring to a uniform length. This approach is shown in WO2008/114049, which describes a method and apparatus for testing pipe joints for use in making subsea pipeline that involves testing a ring specimen (hereinafter "the test ring") cut and machined from manufactured pipe joint.

The test ring is placed in a rigid frame that allows the machined faces of the test ring to be sealed such that a pressure can be applied only to the outer circular surface of the test ring. The inner circular surface of the test ring is maintained at ambient pressure and thus is suitable for attachment of devices to measure the strains and deformations that are caused by the pressure on the outer circular surface of the test ring.

The seals on both machined flat faces of the test ring are such that during the pressure collapse test, deformation of the circular faces of the test ring is impeded. The seals on the flat faces of the ring are such that during testing the pressure is constrained to be on the outer circular surface of the test ring only and only on a small area of the flat machined faces. The seals are such that the test ring is not subject to substantial forces parallel to the machined flat faces such that the deformations of the circular faces of the test ring are impeded.

The pressure is applied from an external pump such that the pressure is increased or decreased by the addition or subtraction of a specified volume of fluid to or from the space surrounding the outer circular surface of the test ring. This arrangement allows the radial deformations of the test ring caused by the pressure on the outer cylindrical surface to increase or decrease in a controlled manner.

The action of the seals on the machined flat surfaces of the test ring can be achieved by encasing the test ring in a rigid block that is shaped to ensure that there is no deformation at the seals. An alternative arrangement is to have the space in which the seals operate adjustable and controlled by the action of a piston that is subjects to the same (or different) pressure as that applied to the outside cylindrical surface of the test ring.

A typical test will involve the following steps: i) cut the test ring from the pipe and machine the ends flat and parallel to within prescribed tolerances; ii) fit attachments to measure the strains and deformations of the test ring; iii) fit the test ring into the frame with the seals in place; vi) apply pressure and ensure the seals are active and effective; v) increase the pressure, recording the strain and deformation measurements; and, vi) continue to increase the pressure until a maximum value is attained; that is, until the occurrence of external pressure collapse.

It may be useful to also plot a curve of pressure applied against maximum strain measured to detect the onset of an accelerating nonlinear reduction in ring diameter with increasing pressure that is independent of any leakage of hydraulic fluid past the seals.

FIG. 1 shows a pipe joint 10 used in subsea pipelines. A typical example will be about 12.2 m long, have an external diameter of 508 mm and a wall thickness of 35 mm. The test ring 12 (also shown in FIG. 2) is cut from one end of the pipe and has a length of 70 mm, approximately twice the wall thickness. Even after this length of test ring 12 has been cut, the pipe joint 10 can still be used in construction of a pipeline. The end surfaces 14 of the test ring 12 are machined so as to be substantially parallel and flat. By substantially parallel and flat, it is meant that there is a tolerance of ±0.01 mm on the overall length of the test ring 12. Preferably the roughness factor should not exceed ISO Grade N6.

FIG. 3 and FIG. 4 show one embodiment of a test apparatus for use in the test method, set up with a test ring 12 in place for testing. The test ring 12 is mounted between the top section 16 and lower section 18 which together define a pressure test chamber. The two sections of the pressure test chamber 16, 18 are provided with locating spigots 19, which locate in corresponding locating holes with associated seals 21 to allow location of the two halves. O-ring or pressure-energized pressure containing seals 20 are provided in the top and bottom sections. These are engaged by the test ring 12 to form an annulus accessible by a supply of pressurized hydraulic test fluid through an appropriate inlet port 24. The central void 26 inside the test ring 12 is vented to atmosphere through a bleed hole 28 which is of sufficiently large diameter to also provide access for any instrumentation cabling to the strain gauges (not shown) on the inner cylindrical surface of the test ring 12.

The two halves 16, 18 are held together by mechanical sealing screws 30. The screws 30 extend through holes 32 in the top section 16 and pass through the void 26 to engage in threaded bores 34 in the bottom section 18. Two screws 30 are shown but any suitable number can be used to ensure proper clamping.

The force with which the two sections 16, 18 are held together is sufficient to make the annulus 22 pressure tight internally and externally against the pressure containing seals 20, 21. The tolerance with which the test ring 12 is cut from the pipe is such that no leakage occurs from the annulus 22 into the void 26 whilst at the same time avoiding undue restraining friction on the radial movement inwards of the test ring 12 outer diameter under hydraulic loading.

FIG. 5 shows a second embodiment of the test apparatus in which the clamping screws shown in FIG. 3 and FIG. 4 are replaced by a hydraulic piston arrangement. A cylinder 36 is formed in the lower section 18 in which a piston 38 is slidably located. The outer end of the cylinder is closed by a plate 40. A bore 42 equipped with sliding seals extends from the inner end of the cylinder 36 to the void 26. A connecting rod 44 extends from the piston 38, through the bore 42 to a locating bore 46 in the top section 16 where it is fixed to a piston ring clamp 48. An inlet port 50 is provided at the lower end of the cylinder 36 to allow pressurized fluid to be admitted which drives the piston 38 along the cylinder 36 to clamp the top section 16 to the lower section 18.

FIG. 6 shows a further embodiment of the test apparatus for use in the test method set up with a test ring 12 in place for testing. The test ring is mounted between a top cylindrical section 16 and a bottom cylindrical section 18 with a spacer ring section 52 located therein between, which together define a pressure test chamber. The apparatus is provided with an inlet port 24 to supply pressurized fluid to the pressure chamber.

The top and bottom sections are in the form of a ring, having a central aperture 26. The central aperture provides access to the center of the test equipment and the inner surface of the test ring, for the attachment of the sensors and other equipment for carrying out a pressure collapse test. The opposing surfaces of the top and bottom sections, are stepped forming a shoulder 54 extending circumferentially around the bottom and top edge of the top 16 and bottom 18 sections respectively. This provides a protruding annular stepped section 56 between the shoulder and the aperture of each section. The shoulder 54 of each section provides a support surface between which to locate the spacer ring 52. The annular stepped section 56 of each of the top and bottom sections provides a support surface on which to mount the test ring 12. The outer diameter of the annular stepped section corresponds substantially with the inner diameter of the spacer ring 52. The spacer ring 52 assists in adjusting the distance between the two faces of the top and bottom sections. The inner diameter of the spacer ring 52 is smaller than the outer diameter of the top 16 and bottom 18 sections, and larger than the diameter of their respective aperture. The outer diameter of the spacer ring 52 is larger than the outer diameter of the top 16 and bottom 18 sections.

Circumferential grooves for holding sealing means 20 are provided in the opposing faces of the top 16 and bottom 18 sections. Additional sealing means 58 are provided between the spacer ring 52 and the side surfaces of the annular stepped sections 56 of the top 16 and bottom 18 sections, in circumferential grooves in the side surface of the annular stepped section.

The top and bottom section sections are held together by mechanical sealing means, for examples screws (not shown), which extend through holes 32 around the outer edge of the top section 16 and spacer ring 20 to engage with holes 32 in the bottom section 18. Additional securing means can extend through the holes in the annular stepped section 56 of the top section and engage with holes in the annular stepped section 56 of the bottom section 18. Any number of securing means can be used to ensure proper clamping of the sections together.

This test method, together with the associated test apparatuses, demonstrates a number of advantages over the previous approach of the full-scale pipe testing. Firstly, it allows the testing of a representative sample of test rings taken from all the pipe joints required for a pipeline to give direct physical quantified evidence of the capacity of each of these pipe joints to resist external hydrostatic pressure collapse. The collapse tolerance of each test ring can be confidently held to be representative of the collapse tolerance of the pipe joint from which it is cut. Secondly, use of the test method is significant less expensive than carrying out full-scale pipe tests and therefore results in a larger data set, which permits a reduction in the safety factor currently used in the example guidance to increase the wall thickness of the whole pipeline based on the increasing exposure of the pipeline with increasing length, to the increasing statistical probability of a single joint sufficiently out-of-specification to precipitate collapse. The pipe joint from which each test ring is cut can still be utilized as a production pipe joint and is therefore not wasted.

Once the target wall thickness has been calculated, a plurality of preliminary pipe joints are manufactured, each pipe joint comprises the internal diameter and the target wall thickness. External pressure collapse tests are then carried out on the preliminary pipe joints to determine their tolerance to the external hydrostatic pressures, resulting in a data set representative of the hydrostatic collapse pressures at which the preliminary pipes collapse. The external pressure collapse tests can be carried out on either the full-scale pipe joints or, preferably, using the foregoing test method developed by the applicant.

The data set is then inspected to determine what the hydrostatic collapse pressure would be at a probability of $10^{-7}$, for example. This is done by plotting a probability distribution based on the data set. Current practice is to fit a Normal distribution model to the data set in order to obtain the probability distribution. However, embodiments of the present invention determine the probability distribution by fitting a statistical tail model derived from Extreme Value Theory, such as a Generalized Pareto Distribution (GPD) model. FIG. 7 shows a graph 61 of the probability density function f(x) plotted against the hydrostatic pressure (x), and shows the difference between the density function of a fitted Normal model 62 and a fitted GPD model 64. Both models 62, 64 are fitted to a data set that lies in a range of 34.7 MPa and 44.4 MPa, and the graph 61 is plotted over a range of 25 MPa to 40 MPa, which spans both the range of the data set and the extreme lower tail of the distribution at which there are no observations. The fitted Normal model 62 shows the bell shaped distribution, with a mean 39.2 MPa and standard deviation 2.1 MPa corresponding to the sample mean and standard deviation, respectively. The fitted GPD model 64 is a statistical tail model, in this instance, fitted only to data below a threshold of 40.3 MPa. The parameters of the distribution of the fitted GPD model 64 are scale 3.91 MPa and shape −0.669. These parameters are posterior means derived using Bayesian MCMC methods. It will be apparent from the graph 61 that the distribution derived from the fitted GPD model 64 has a convex tail, which stops abruptly at a finite lower end point. This contrasts with distribution derived from the fitted Normal distribution model, which has an infinitely long continuous tail along which the level of predicted collapse pressure exponentially reduces as the probability of collapse reduces.

FIG. 8 and FIG. 9 show graphs 66, 68 respectively, plotting the distribution functions for the two models 62, 64 over a probability range, moving from the range in which there is data to the far lower tail for which there are no extreme observations. It can be seen from FIG. 8 that the distribution functions for the two models 62, 64 over a probability range of 0 to 0.6 agree closely in the range for which there is data.

The graph 68 of FIG. 9 shows the distribution functions for the two models 62, 64 over a probability range $10^{-1}$ to $10^{-9}$. This plot emphasizes the difference between the two models 62, 64 as they are extrapolated further from the data set to estimate probabilities of external pressure collapse for pressures beyond the range of the data set. It will be apparent from the graph 68 that the distribution function derived from the fitted Normal model 62, which has a lower tail decaying slowly towards zero, assigns far higher probabilities of collapse when compared to the distribution curve obtained from the fitted GPD model 64, which has a convex shape and a finite lower endpoint that is relatively close to the smallest observed data point in the data set.

The use of the fitted GPD model provides a new method of reliably predicting the external pressure collapse of pipe joints that permits a highly significant reduction in the wall thickness of the pipe joint, providing improved commercial availability of pipelines and significant cost savings. For example, assuming that the data set relates to a pipe joint to be installed at a depth of 2,500 m, the minimum allowable collapse pressure for the pipe joint would be in the region of 25.1 MPa based on a water density of 1,025 kg/m$^3$ and a gravitational acceleration of 9.81 m/s$^2$. Turning to FIG. 9, the data set shows that the pipe collapse pressure at a probability of $10^{-7}$ based on the distribution function derived from the fitted Normal model 62 would be in the region of 29 MPa. Comparing this pressure with the minimum allowable collapse pressure of 25.1 MPa shows that the target wall thickness and the internal diameter of the point joint are safe and perhaps the wall thickness could be reduced slightly by, for example, 1 mm. For this example, assume that the pipeline has a length of 500 km. The construction of such a pipeline would require in the region of 40,000 pipe joints. If the cost of pipe steel is around £19,000 per m³, reducing the wall thickness by 1 mm would result in a saving of around £23 million.

The same data set shows that the pipe collapse pressure at a probability of $10^{-7}$ based on the distribution function derived from the fitted GPD model 64 is in the region of 34.5 MPa. Comparing this pressure with the minimum allowable collapse pressure of 25.1 MPa shows that the target wall thickness is too conservative, which opens up the opportunity to reduce significantly the wall thickness, leading to considerably large cost savings. Following on from the above example, the difference between the pipe collapse pressure derived using the fitted GPD model 64 at a probability of $10^{-7}$ and the minimum allowable collapse pressure of 25.1 MPa show that the wall thickness could be significantly reduced by as much as 9 mm or so. Such a reduction in wall thickness could lead to savings in the region of £204 million, which is an order of magnitude higher when compared to the potential savings derived using a probability distribution function derived using the fitted Normal distribution model 62.

Methods according to the invention are notable departures from conventional methods of designing pipe joints that were established decades ago and continue to be used today, and provide a considerable commercial advantage in the availability of subsea pipelines, and in manufacturing and installing of pipe joints for use in the pipelines. Those skilled in the art will appreciate that the presently disclosed methods teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and apparatuses, which, as a matter of language, might be said to fall there between.

The invention claimed is:

1. A method of determining a wall thickness of a pipe joint for use in a subsea pipeline, the method comprising:
   determining an internal diameter of the pipe joint;
   determining a minimum allowable hydrostatic pressure at a depth at which the pipe joint is to be used;
   determining a target wall thickness for the pipe joint, the target wall thickness corresponding to the internal diameter and the minimum allowable hydrostatic pressure;
   manufacturing a plurality of preliminary pipe joints having the internal diameter and the target wall thickness;
   carrying out external pressure collapse tests resulting in data representative of the hydrostatic collapse pressures at which the plurality of preliminary pipe joints collapse;
   determining a probability distribution corresponding to the data based on a Generalized Pareto Distribution derived from Extreme Value Theory;
   determining from the probability distribution a hydrostatic collapse pressure occurring with a probability of $10^{-5}$ or lower; and,
   determining a wall thickness of the pipe joint corresponding to the internal diameter and the hydrostatic collapse pressure.

2. The method as claimed in claim 1, wherein carrying out external pressure collapse tests further includes:
   cutting a ring from one or more of the plurality of preliminary pipe joints;
   forming flat substantially parallel surfaces on the ends of the ring;
   mounting the ring in a pressure chamber such that the ends of the ring form seals with opposing walls of the chamber to isolate an inside of the ring from an outside of the ring;
   increasing the pressure outside the ring and measuring strain and deformation on the ring as the pressure increases; and
   determining a comparison of pressure applied to the outside of the ring and maximum strain measured to detect an onset of accelerating non-linear reduction in ring diameter with increasing pressure.

3. The method as claimed in claim 2, wherein measuring strain and deformation on the ring comprises applying sensors to the ring.

4. The method as claimed in claim 3, comprising deploying the sensors on the inner surface of the ring.

5. The method as claimed in claim 2, wherein mounting the ring in the pressure chamber includes providing seals between the ends of the ring and the walls of the chamber.

6. The method as claimed in claim 2, wherein increasing the pressure outside the ring includes pumping pressurized fluid into the chamber around the outside of the ring.

7. The method as claimed in claim 2, comprising selecting a length of ring cut from the pipe joints such that the pipe still remains within tolerances for use in the pipeline.

8. The method as claimed in claim 7, comprising selecting the length of ring cut from the pipe joints to be about twice the thickness of the wall of the pipe joint.

9. The method as claimed in claim 7, comprising selecting the length of ring cut from the preliminary pipe joints to be about 50 mm.

10. The method as claimed in claim 1, wherein determining the minimum allowable hydrostatic pressure at the depth at which the pipe joint is to be used further includes applying a safety factor to the depth at which the pipe joint is to be used.

11. The method as claimed in claim 10, wherein the safety factor is added to the depth at which the pipe joint is to be used.

12. The method as claimed in claim 10, wherein the safety factor is a coefficient.

13. The method as claimed in claim 12, wherein the safety factor is 1.1.

14. The method as claimed in claim 1, wherein determining the hydrostatic collapse pressure occurring with the probability of $10^{-5}$ or lower comprises determining from the probability distribution a hydrostatic collapse pressure occurring with a probability of $10^{-6}$ or $10^{-7}$.

15. The method as claimed in claim 1, wherein the scale and shape parameter values of the Generalized Pareto Distribution are derived using Bayesian MCMC methods.

16. The method as claimed in claim 1, wherein the shape parameter value of the Generalized Pareto Distribution is −0.5 or less.

17. The method as claimed in claim 1, further comprising manufacturing a plurality of pipe joints having the internal diameter and the wall thickness.

18. The method as claimed in claim 17, further comprising carrying out external pressure collapse tests resulting in data representative of hydrostatic collapse pressures at which the plurality of pipe joints collapse.

19. The method as claimed in claim 18, wherein the external pressure collapse tests comprise:
   cutting a ring from one or more of the plurality of pipe joints;
   forming flat substantially parallel surfaces on the ends of the ring;
   providing one or more measurement devices for measuring strain and deformation of the ring;
   mounting the ring in a pressure chamber such that the ends of the ring form seals with opposing walls of the chamber to isolate the inside of the ring from the outside;
   increasing the pressure outside the ring and measuring the strain and deformation on the ring as the pressure increases; and,
   determining a comparison of pressure applied to the outside of the ring and maximum strain measured to detect an onset of accelerating non-linear reduction in ring diameter with increasing pressure.

20. A pipe joint for use in a subsea pipeline, the pipe joint having a wall thickness determined according to the method of claim 1.

21. A subsea pipeline comprising one or more pipe joints having a wall thickness determined according to the method of claim 1.

22. A method of determining a hydrostatic collapse pressure of a pipe joint for use in a subsea pipeline, the method comprising:
   determining an internal diameter of the pipe joint;
   determining a minimum allowable hydrostatic pressure at a depth at which the pipe joint is to be used;
   determining a target wall thickness for the pipe joint, the target wall thickness corresponding to the internal diameter and the minimum allowable hydrostatic pressure;
   manufacturing a plurality of preliminary pipe joints having the internal diameter and the target wall thickness;
   carrying out external pressure collapse tests resulting in data representative of the hydrostatic collapse pressures at which the plurality of preliminary pipe joints collapse;
   determining a probability distribution corresponding to the data based on a Generalized Pareto Distribution derived from Extreme Value Theory; and,
   determining from the probability distribution a hydrostatic collapse pressure occurring with a probability of $10^{-5}$ or lower.

23. The method as claimed in claim 22, further comprising determining the wall thickness of the pipe joint corresponding to the internal diameter and the hydrostatic collapse pressure.

* * * * *